(12) United States Patent
Tsuda et al.

(10) Patent No.: US 11,012,880 B2
(45) Date of Patent: May 18, 2021

(54) WIRELESS COMMUNICATION DEVICES, NETWORK CONNECTION NODES, SYSTEMS AND METHODS

(71) Applicant: SONY CORPORATION, Tokyo (JP)

(72) Inventors: Shinichiro Tsuda, Hampshire (GB); Yuxin Wei, Hampshire (GB); Hideji Wakabayashi, Hampshire (GB)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 16/091,318

(22) PCT Filed: Apr. 6, 2017

(86) PCT No.: PCT/EP2017/058250
§ 371 (c)(1),
(2) Date: Oct. 4, 2018

(87) PCT Pub. No.: WO2017/174720
PCT Pub. Date: Oct. 12, 2017

(65) Prior Publication Data
US 2019/0159053 A1    May 23, 2019

(30) Foreign Application Priority Data

Apr. 6, 2016 (EP) .................................... 16164099

(51) Int. Cl.
*H04W 24/10* (2009.01)
*H04B 17/309* (2015.01)
(Continued)

(52) U.S. Cl.
CPC .......... *H04W 24/10* (2013.01); *H04B 17/309* (2015.01); *H04B 17/382* (2015.01);
(Continued)

(58) Field of Classification Search
None
See application file for complete search history.

(56) References Cited

U.S. PATENT DOCUMENTS

2011/0195708 A1* 8/2011 Moberg ............ H04W 36/0094
455/424
2012/0142336 A1* 6/2012 Van Phan ......... H04W 36/0033
455/423
(Continued)

FOREIGN PATENT DOCUMENTS

EP    2 706 782 A1    3/2014
EP    3 154 295 A1    4/2017
(Continued)

OTHER PUBLICATIONS

Author Unknown, Draft Report of 3GPP TSG RAN WG2 meeting #91bis, pp. 1-207, Nov. 20, 2015 (Year: 2015).*
(Continued)

*Primary Examiner* — Christopher M Crutchfield
(74) *Attorney, Agent, or Firm* — Xsensus LLP

(57) ABSTRACT

A wireless communication device comprising circuitry that is configured to measure, in an idle mode, only macro cells, and to start the measurement of one or more indirect network connection nodes in accordance with the wireless communication device turning into a connected mode.

16 Claims, 8 Drawing Sheets

(51) Int. Cl.
  *H04B 17/382* (2015.01)
  *H04W 48/16* (2009.01)
  *H04W 76/14* (2018.01)
  *H04W 88/04* (2009.01)
  *H04W 76/27* (2018.01)
  *H04L 1/18* (2006.01)
  *H04W 16/32* (2009.01)

(52) U.S. Cl.
  CPC .......... *H04L 1/1812* (2013.01); *H04W 16/32* (2013.01); *H04W 48/16* (2013.01); *H04W 76/14* (2018.02); *H04W 76/27* (2018.02); *H04W 88/04* (2013.01)

(56) References Cited

U.S. PATENT DOCUMENTS

2013/0225166 A1* 8/2013 Akhtar .................. H04W 24/02
                                                              455/435.1
2015/0296426 A1* 10/2015 Mildh .................. H04W 36/32
                                                              455/436
2015/0358866 A1    12/2015 Xu et al.
2017/0019839 A1*   1/2017 Li ........................... H04L 67/12
2018/0343600 A1*  11/2018 Ma ....................... H04W 12/001
2020/0128466 A1*   4/2020 Vutukuri ............... H04W 36/30

FOREIGN PATENT DOCUMENTS

GB        1512612     *  6/1978
WO    2012/072147 A1     0/6201
WO    2011/100673 A1     8/2011
WO    2015/065010 A1     5/2015
WO    2015/186824 A1    12/2015
WO    2016/049431 A1     3/2016

OTHER PUBLICATIONS

Communications Pursuant to Article 94(3) EPC dated Feb. 19, 2020 in European Application No. 18 186 724.3-1205.
International Search Report and Written Opinion for PCT Application No. PCT/EP2017/058250 dated Jul. 21, 2017.
Extended Search Report issued in European Application 18186724.3-1219 dated Oct. 15, 2018.

* cited by examiner

WIRELESS COMMUNICATION DEVICES, NETWORK CONNECTION NODES, SYSTEMS AND METHODS

TECHNICAL HELD

The present disclosure generally pertains to the field of wireless telecommunications, in particular to wireless communication devices, network connection nodes, communication systems and methods for such communication systems.

TECHNICAL BACKGROUND

Several generations of mobile telecommunications systems are known, e.g. the third generation ("3G") which is also known as UMTS standard, the fourth generation ("4G"), known as the LTE standard, and the current fifth generation ("5G"), which is still under development.

LTE is standardized under the control of 3GPP ("3rd Generation Partnership Project") and there exists a successor LTE-A (LTE Advanced) which allowing higher data rates as the basis LTE and which is also standardized under the control of 3GPP.

The 5G system will be based on LTE or LET-A, respectively, so that specific requirements of the 5G technologies will be based on technology that is already defined in the LTE and LTE-A standard documentation.

5G technologies will allow a concept of a so called "virtual cells", "local cells", or the like. In this concept a cell may be served by a user equipment ("UE"). In short the UE may work dynamically as an intermediate node for establishing an indirect network connection between other UEs in the vicinity of the virtual cell or local cell and the network, and/or as an intermediate node between UEs. A function of the intermediate node on the UE may be carried out by "virtualization". A virtual cell or local cell may communicate with UEs in unlicensed, shared licensed or licensed bands, and it backhauls to network preferably in licensed bands.

A logical separation between control plane and user plane has been done in accordance with introduction of the IP Multimedia System (IMS) for LTE, and a physical separation between control plane and user plane has been proposed as a possible solution for 5G. Since requirements for the control plane should be basically robustness and wide coverage so as to maintain the service continuity, a macro base station should provide a link of the control plane. On the other hand a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

Still further, Radio Resource Control (RRC) is categorized into the control plane and the RRC management should be performed in accordance with methods to provide the control plane in the context of a physical separation between control plane and user plane in 5G.

In view of this it is generally desirable to improve known wireless communication methods, systems, devices and network nodes.

SUMMARY

According to a first aspect the disclosure provides a wireless communication device comprising circuitry that is configured to measure, in an idle mode, only macro cells, and to start the measurement of one or more indirect network connection nodes in accordance with the wireless communication device turning into a connected mode.

According to a further aspect the disclosure provides a method comprising: sending, by a macro cell, a configuration message to a wireless communication device, the configuration message comprising a configuration of measurement reporting, and performing, by the wireless communication device, a measurement of one or more indirect network connection nodes for providing a user plane as well as macro cells, according to configured setup of measurement reporting.

According to a still further aspect the disclosure provides a method comprising: sending, by a UE, an RRC Connection Request message to an eNB; sending, by the eNB, an RRC Connection Setup message to the UE, the RRC Connection Setup message comprising a configuration of UE measurement reporting; sending, by the UE, a RRC Connection Setup Complete message to the eNB; starting, by the eNB, the provision of control plane to the UE; performing, by the UE, a measurement of virtual cells for user plane as well as macro cells, according to configured setup of measurement reporting; sending, by the UE, a respective measurement report to eNB when an event of reporting a measurement is triggered; requesting, by the eNB, a virtual cell to provide the UE with a user plane; and starting, by the virtual cell, to provide the UE with a user plane.

According to a still further aspect the disclosure provides an indirect network connection node comprising circuitry configured to provide a user plane and/or a control plane to a wireless communication device.

According to a still further aspect the disclosure provides a system comprising a wireless communication device; at least one macro cell, the macro cell being configured to provide a control plane to the wireless communication device; and at least one indirect network connection node, the indirect network connection node being configured to provide a user plane and/or a control plane to the wireless communication device.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
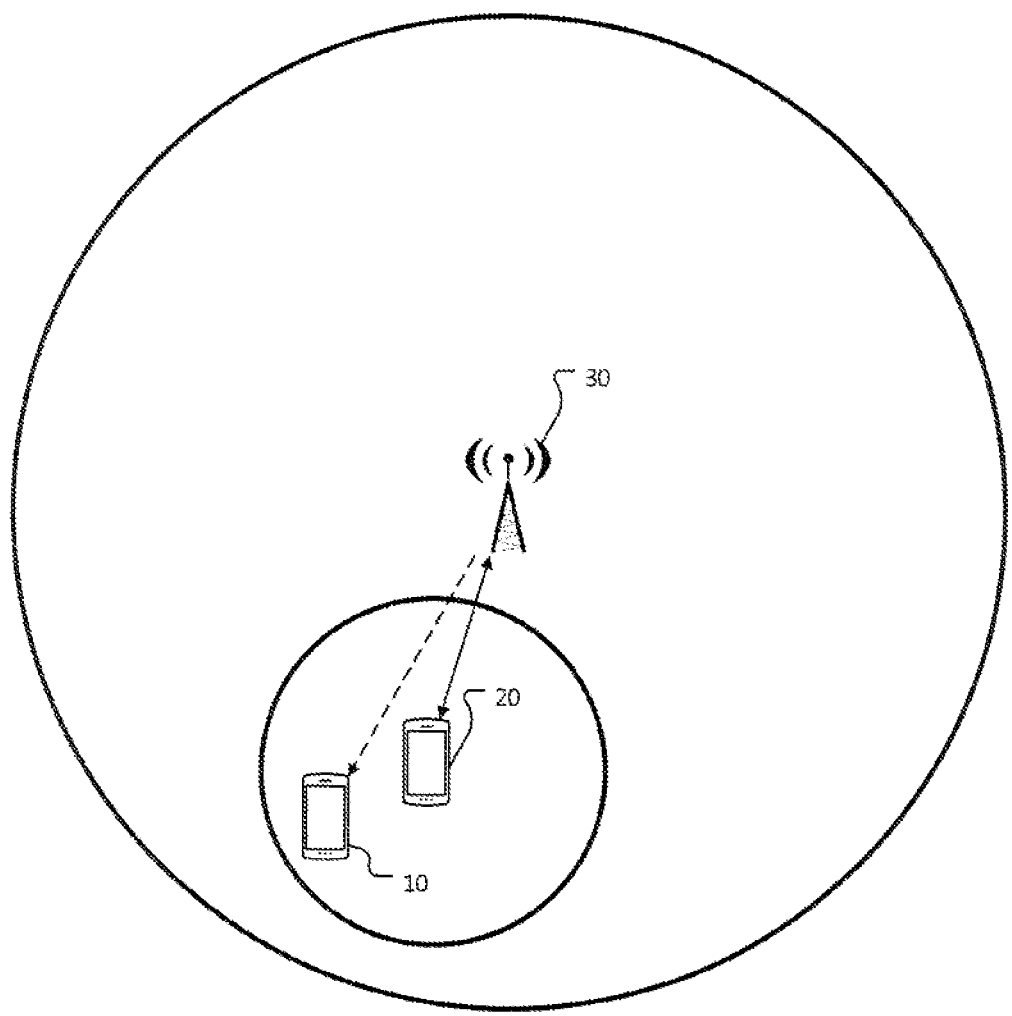
FIG. 1 schematically discloses an example of a UE operating in idle mode.

Before a detailed description of the embodiments under reference of the Figures is given, some general explanations are made.

The embodiments disclose a wireless communication device comprising circuitry that is configured to measure, in an idle mode, only macro cells, and to start the measurement of one or more indirect network connection nodes in accordance with the wireless communication device turning into a connected mode.

The wireless communication device may for example be a user equipment (UE) such as a mobile phone, a computer, tablet, tablet personal computer, or the like.

Macro cells may for example be defined by base stations that have a direct link to the network, e.g. a eNB, or the like.

An indirect network connection node may be any network connection node that is indirectly connected to the network via another base station, e.g. via an eNB.

Indirect network connection nodes may for example comprise high dense wireless small cells, e.g. a virtual cell, local cell, or the like.

A virtual cell/local cell may for example be a user equipment (UE), e.g. a mobile phone, a computer, tablet, tablet personal computer or the like, including a mobile communication interface, or any other device which is able to perform a mobile telecommunication via, for example, LTE(-A), such as a hot spot device with a mobile communication interface.

The wireless communication device (acting as UE in a network) may initially be in the idle mode, where it measures only macro cells. The idle mode may for example be an RRC Idle mode, or the like. The measurement of (macro) cells relates to mobility management. By means of the measurements of macro cells, the wireless communication device may select a base station (e.g. an eNB) among candidate base stations which are configured prior to the establishment of a connection to the network. In general, the aim of mobility management is to track where UE is located, allowing calls, SMS and other mobile phone services to be delivered to them. For example, in the RRC Idle mode mobility management can be implemented through the cell selection/reselection process. The wireless communication device may autonomously perform cell reselection, i.e. it may change from cell to cell whenever required by signal conditions.

In order to start data or voice transmission, the wireless communication device turns from idle mode into connected mode. In the connected mode, the wireless communication device is connected with a macro cell which provides a control plane to the wireless electronic device. The connected mode may for example be an RRC Connected mode. The connected mode must not necessarily be an operational connected mode (including the provision of a user plane). It may also be an initial connected state such as a RRC Initial Connected mode, in which only a control plane is provided to the wireless communication device by a macro cell (e.g. by an eNB).

The embodiments also disclose a wireless communication device in which the circuitry is configured to receive/transmit a control plane from/to a macro cell and a user plane from/to an indirect network connection node.

The embodiments described in more detail below disclose an RRC management under network operation with separated control plane and user plane utilizing an indirect network connection node such as a high dense wireless small cell, e.g. a virtual cell/local cell. According to the embodiments, the wireless communication device may exchange data with a network via the user plane provided by the indirect network connection node (e.g. virtual cell/local cell). At the user plane side, an application may create data packets that are processed by protocols such as TCP, UDP and IP, while in the control plane, the radio resource control (RRC) protocol writes signaling messages that are exchanged between a base station (eNB) and the wireless communication device (UE). A control plane may handle radio-specific functionality which depends on the state of the UE, e.g. the RRC states: idle or connected. A user plane protocol stack between the eNB and UE may for example comprise the sub-layers PDCP (Packet Data Convergence Protocol), RLC (radio Link Control), and Medium Access Control (MAC).

The providing of a user plane by the indirect network connection node to the wireless communication device may reduce overhead of measurement for selection of base stations under operation with separation of control plane and user plane.

The embodiments also disclose a wireless communication device in which the circuitry is configured to trigger a measurement of virtual cells/local cells in addition to that of macro cells in accordance with an RRC connection establishment.

The RRC connection establishment procedure is well known as the procedure which is used to make the transition from RRC Idle mode to RRC Connected mode. A UE makes the transition to RRC Connected mode before transferring any application data, or completing any signaling procedures.

The embodiments also disclose a wireless communication device in which the circuitry is further configured to receive a configuration message and to perform measurement reporting as defined by the configuration message.

This configuration message may for example be an RRC Connection Setup message. A measurement reporting that is configured by a RRC Connection Setup message may for example include intra-frequency/inter-frequency measurement for attaching a user plane served by a virtual cell/local cell.

The configuration of the measurement may for example be defined by "Measurement Objects", "Reporting Configurations", "Measurement Identities", "Quantity Configurations" and "Measurement Gaps" identified in a RRC Connection Setup message.

The embodiments also disclose a wireless communication device in which the configuration message defines measurement objects, the measurement objects including intra-frequency measurement objects/inter-frequency measurement objects which specify individual cells to measure. A list of measurement objects that specifies individual cells that are to be measured by a UE may be regarded as a whitelist or Neighbour Cell List of measurement objects. The whitelist/Neighbour Cell List may in particular comprise indirect network connection nodes such as virtual cells/local cells in addition to macro cells. Individual cells may for example be referred to by their Physical layer Cell Identities (PCI) in conventional manner.

The embodiments also disclose a wireless communication device in which the configuration message defines individual cells that are to be excluded from measurements. A list of measurement objects that specifies individual cells that are to be excluded from measurements by the wireless communication device (UE) may be regarded as a blacklist of measurement objects. The black list may in particular comprise indirect network connection nodes such as virtual cells/local cells in addition to macro cells. As in the case of the whitelist, individual cells may for example be referred to by their Physical layer Cell Identities (PCI) in conventional manner.

The embodiments also disclose a wireless communication device in which the configuration message defines one or more macro cells for a provision of control plane and one or more indirect network connection nodes for a provision of a user plane. According to this embodiment, the wireless communication device may measure further the indirect network connection node(s) configured by a RRC Connection Reconfiguration message in accordance with RRC connection establishment procedure performed via control plane served by macro-cell, during only connected mode. That is to say, the wireless communication device can measure only the macro cell(s) during idle mode and do the indirect network connection node(s) such as virtual cell(s)/local cell(s) as well as the macro cell(s) during connected mode. According to yet an alternative embodiment a whitelist/Neighbour Cell List may be categorized into lists for idle mode and connected mode.

Still alternatively a whitelist/Neighbour Cell List may be categorized into lists for control plane and user plane.

These lists related to Intra-Frequency may be provided via SIB(System Information Block)4 and those related to Inter-Frequency are provided via SIB5.

According to a further alternative embodiment another whitelist/Neighbour Cell List for connected mode or user plane may include virtual cells/local cells as candidate cells for measurement, as different from macro cells which are included in a whitelist/Neighbour Cell List for control plane or idle mode. This another whitelist/Neighbour Cell List can be provided via SIB4 or SIB5 depending on Intra-Frequency or Inter-Frequency, or it may be provided via some different SIB(s) in accordance with a RRC Connection Setup, RRC Connection Reconfiguration and RRC Connection Re-establishment messages. Here e.g. the RRC Connection Setup message can be sent in an RRC connection establishment procedure which allows a UE to make the transition from RRC Idle mode to RRC Connected mode. Furthermore whether the said another whitelist/Neighbour Cell List is provided, may depend on what kind of applications the UE initiates, what kind of UE capabilities/categories the UE has or what kind of mobility states the UE is (e.g. with pedestrian, in a vehicle, in a train or the like), in accordance with the RRC connection establishment procedure.

Furthermore, indirect network connection nodes such as virtual cells/local cells may operate with different Radio Access Technologies (RAT), in particular with different Radio Access Technologies than macro cells. In such cases individual lists (e.g. blacklists and whitelists/Neighbour Cell Lists) may be foreseen for each Radio Access Technology. For example, the "Measurement Objects" may include individual whitelists/Neighbour Cell Lists and/or blacklists for virtual cells/local cells which operate with a different Radio Access Technologies (RAT), as well as an individual whitelist/Neighbour Cell List and blacklist for virtual cells/local cells operating with the same RAT as a macro-cell.

The embodiments also disclose a wireless communication device in which the circuitry is further configured to manage connection states in cooperation with the network, wherein connection states for a control plane include an idle and/or a connected state, and the connection states for the user plane include at a least a connected state. This may for example be achieved by a separate connection state management of the remote UE to control plane or user plane, respectively.

The embodiments also disclose a wireless communication device in which the circuitry is further configured to configure settings related to measurement reporting based on a classification of cell identification. The cell classification may for example be based on at least one of a size of cell coverage, a maximum transmission power, a number of equipped antenna, an operating frequency band and bandwidth.

The embodiments also disclose a wireless communication device in which the circuitry is further configured to receive/transmit a control plane provided by an indirect network connection node and a user plane that is provided by the indirect network connection node.

For example, a connection to an indirect network connection node may be divided into a connection for control signaling (control plane) and a connection for data communication (user plane) in logical or physical manner.

The embodiments also disclose a wireless communication device in which the circuitry is further configured to receive/transmit a first control plane provided by an indirect network connection node and a second control plane that is provided by a macro cell.

For example, an indirect network connection node may configure the settings of measurement reporting of the indirect network connection node in accordance with establishment of the connection of the wireless communication device to the indirect network connection node, and a measurement report may be sent on the link between the wireless communication device and the indirect network connection node.

The embodiments also disclose a wireless communication device in which the control plane is provided by a macro cell (e.g. an eNB) and in which the control plane handles controls related to mobility management, the scheduling assignment, and/or the measurement reporting for both the macro cell and the indirect network connection node.

The embodiments also disclose a wireless communication device comprising circuitry configured to manage event triggers for independently reporting measurement results to the macro cell and/or to the indirect network connection node.

For example event driven reports or periodic reports for an eNB can be configured by an RRC Connection Setup message in accordance with the RRC Connection Setup procedure and event driven reports or periodic reports for the virtual cell can be configured by an RRC Connection-Reconfiguration message in accordance with the RRC ConnectionReconfiguration procedure respectively.

According to another embodiment, the measurement of each link between eNB and UE or between a virtual cell/local cell and the UE is handled by the eNB or the virtual cell/local cell independently, each having a respective control plane over each link. Even if independent configuration of measurement reporting is performed, since the eNB handles both decision of handover of eNB itself and attach/detach of the connection between the virtual cell/local cell and UE, the measurement report on the link between virtual cell/local cell and UE may be sent to the eNB via the virtual cell/local cell using its backhaul link.

The embodiments also disclose a wireless communication device in which the circuitry is further configured to perform a HARQ function within the localized area served by the indirect network connection node.

The embodiments also disclose a wireless communication device in which the circuitry is further configured to manage a HARQ on the link between the indirect network connection node and the wireless communication device by a control plane provided by the indirect network connection node so as to perform re-transmission according to HARQ process within the localized area.

The wireless communication device may then confirm the second configuration message by sending a confirmation message such as an RRC ConnectionReconfigurationComplete message to the macro cell.

The embodiments also disclose a method comprising sending, by a macro cell, a configuration message to a wireless communication device, the configuration message comprising a configuration of measurement reporting; and performing, by the wireless communication device, a measurement of one or more indirect network connection nodes for providing a user plane as well as macro cells, according to configured setup of measurement reporting.

The configuration message may for example be an RRC Connection Setup message. The configuration message may for example be sent from an eNB to a UE in response to an RRC Connection Request message that is sent from the UE to the eNB.

The method may further comprise sending, by the wireless communication device, a RRC Connection Setup Complete message to the macro cell.

Still further, the method may comprise starting, by the macro cell (e.g. eNB), the provision of control plane to the wireless communication device.

When any event of reporting a measurement is triggered, the wireless communication device may then send respective measurement reports to the macro cell (e.g. eNB).

The embodiments also disclose a method further comprising, selecting an indirect network connection node by the macro cell (or by a node connected to the macro cell) based on the measurement results reported by the wireless communication device.

Alternatively, an indirect network connection node may be selected by the wireless communication device based on the measurement results.

The embodiments also disclose a method further comprising sending, by the macro cell, a second configuration message to the wireless communication device to indicate an attachment of an indirect network connection node for provision of a user plane to the wireless communication device.

This second configuration message may for example be an RRC ConnectionReconfiguration message. This sending of an second configuration message from the macro cell (e.g. eNB) to the wireless communication device (UE) may by triggered when the macro cell decides, based on the measurement reporting by the wireless communication device, that an indirect network connection node (e.g. a virtual cell/local cell) can provide the wireless communication device with a user plane.

The embodiments also disclose a method further comprising requesting, by the macro cell, an indirect network connection node to provide the wireless communication device with a user plane.

Upon the macro cell's request to provide the wireless communication device with a user plane, the indirect network connection node may then start to provide the wireless communication device with a user plane.

The embodiments also disclose a method further comprising sending, by the macro cell, a connection release message to the wireless communication device. This connection release message may for example be an RRC Connection Release message.

The embodiments also disclose a method comprising: sending, by a UE, an RRC Connection Request message to an eNB; sending, by the eNB, an RRC Connection Setup message to the UE, the RRC Connection Setup message comprising a configuration of UE measurement reporting; sending, by the UE, a RRC Connection Setup Complete message to the eNB; starting, by the eNB, the provision of control plane to the UE; performing, by the UE, a measurement of virtual cells for user plane as well as macro cells, according to configured setup of measurement reporting; sending, by the UE, a respective measurement report to eNB when an event of reporting a measurement is triggered; requesting, by the eNB, a virtual cell/local cell to provide the UE with user plane; and starting, by the virtual cell/local cell, to provide the UE with user plane.

Still further, a wireless communication device may have two connections for control signaling to a first and a second base station and may have to perform measurement and reporting for each link of connection. Although each measurement report of each link can be managed by each link separately, measurement reports of both links can be reported using one of links depending on the link quality, traffic load, or the like. That is to say, in the case that traffic is much loaded on the connection to the first base station, a measurement report of the link between the wireless communication device and the first base station can be reported via the connection to the second base station as well as a measurement report of the link between the wireless communication device and the second base station.

In the embodiments described below in more detail it is further described an indirect network connection node that is configured to provide a user plane and/or a control plane to a wireless communication device.

In the embodiments described below in more detail it is further described a system comprising a wireless communication device as described above, at least one macro cell, the macro cell being configured to provide a control plane to the wireless communication device, and at least one indirect network connection node, the indirect network connection node being configured to provide a user plane and/or a control plane to the wireless communication device. The system may be configured to perform any of the methods described above.

The embodiments described below in more detail focus on efficient operation using localized dense wireless small cells such as virtual cells/local cells under operation with a separation of the control plane and the user plane. One important aspect when using dense small cells is the reduction of overhead in measurements related to mobility and unnecessary handover. The embodiment described below in more detail provide a solution to reduce measurements for cell reselection, including localized dense wireless small cells/local cells in idle mode. Furthermore the embodiments provide a solution for an efficient mobility management, such as independent configurable measurement reporting to the eNB and to the virtual cell/local cell.

Provision of the User Plane by a Virtual Cell/Local Cell Depending on RRC Idle and RRC Connected Mode Embodiments of communication management are shown in the following, assuming usage of a virtual cell/local cell for a provision of a user plane under operation with physical separation between control plane and user plane.

FIG. 1 schematically discloses an example of a UE operating in idle mode. A UE 10 is initially in RRC Idle mode and doesn't have a RRC connection. User entity 10 is within the coverage of an eNB 30 which can provide a direct access to the network (not shown in FIG. 1). Even though coverage of a virtual cell/local cell 20 is available for the UE 10, the UE 10 performs cell selection/reselection in idle mode measuring only eNBs (macro cells) according to the conventional procedure. From a network point of point view, the most necessary function is mobility management in RRC Idle mode, so that the network can perform the paging to UE 10. Here, in RRC Idle mode a macro-based cell selection/reselection procedure is performed, i.e. UE 10 disregards indirect network nodes such as virtual cell/local cell 20 when performing cell selection/reselection. This helps to avoid that the UE 10 is forced to perform a lot of measurements including many virtual cells/local cells which might cause undesirable power consumption.

According to the embodiment of FIG. 1 the UE 10 triggers the measurement including virtual cells/local cells as well as macro cells in accordance with its turning into the RRC Connected mode for communication, e.g. in accordance with a RRC connection establishment procedure (see FIG. 6) which is well known as the procedure which is used to make the transition from RRC Idle mode to RRC Connected mode. In particular, the UE measurement reporting including intra-frequency/inter-frequency measurement for attaching user plane served by a virtual cell/local cell is configured by a RRC Connection Setup message.

Figure 2:
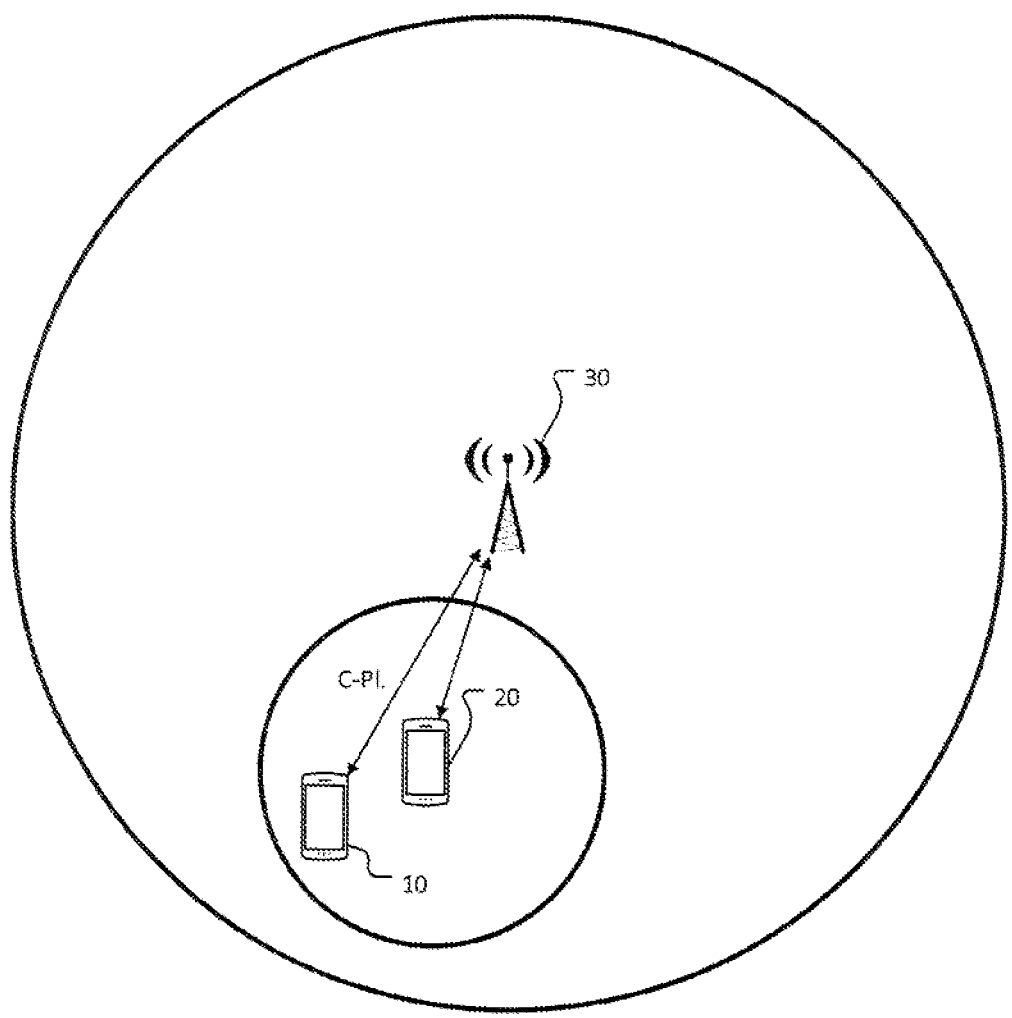
FIG. 2 schematically depicts an example of a UE operating in initial connected mode.

FIG. 2 schematically depicts an example of a UE operating in RRC Initial Connected mode. In order to change to RRC Initial Connected mode, the UE 10 has received a respective RRC connection setup message during the RRC connection establishment procedure. eNB 30 now provides the control plane (C-Pl.) to UE 10. In particular, the RRC connection setup message triggered that the UE 10 performs measurement including virtual cells/local cells as well as macro cells.

Figure 3:
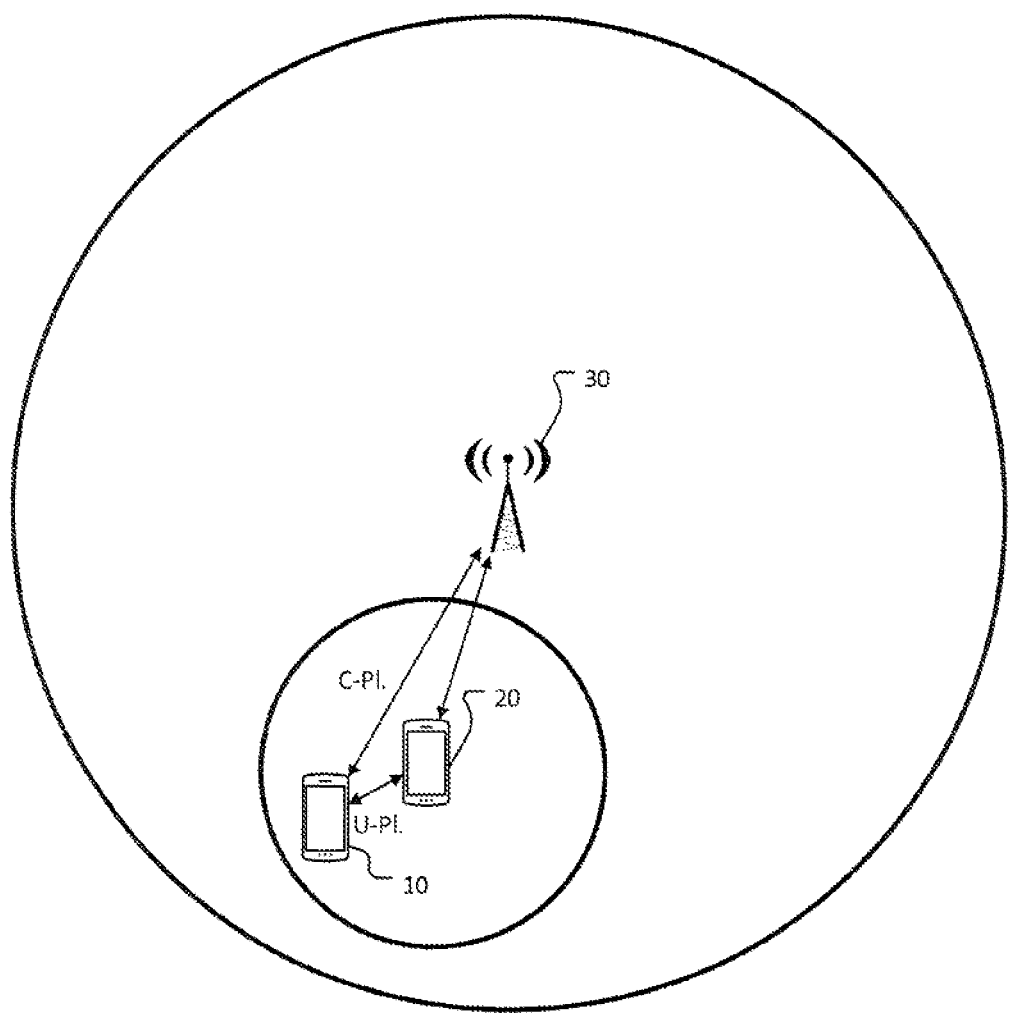
FIG. 3 schematically depicts an example of a UE operating in operational connected mode.

FIG. 3 schematically depicts an example of a UE operating in RRC Operational Connected mode. Based on the measurement reports received from UE 10, the network (e.g. by eNB 30) triggers a provision of user plane from virtual cell/local cell 20 to UE 10. The user entity 10 is now operational connected to the network by means of eNB 30 and virtual cell/local cell 20. eNB 30 provides the control plane (C-Pl.) to user entity 10. Virtual cell/local cell 20 provides the user plane (U-Pl.) to user entity 10.

Figures 4, 5:
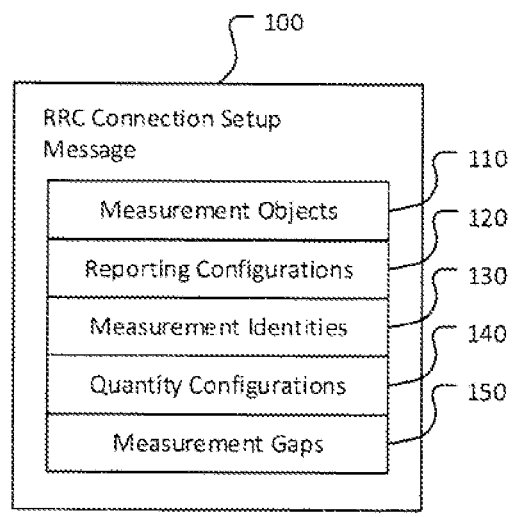
FIG. 4 shows an embodiment of a RRC Connection Setup message.
FIG. 5 shows "Measurement Objects" in more detail.

FIG. 4 shows an embodiment of an RRC Connection Setup message. The RRC Connection Setup message 100 defines "Measurement Objects" 110, "Reporting Configurations" 120, "Measurement Identities" 130, "Quantity Configurations" 140 and "Measurement Gaps" 150. "Measurement Objects" 110 defines the objects on which the UE shall perform the measurements, e.g. frequencies and cells, including intra- and inter-frequency measurement object, etc. Intra-frequency and inter-frequency measurement object can specify individual cells to measure (whitelist), and individual cells to exclude from measurements (blacklist. Individual cells are referenced by their Physical layer Cell Identities (PCI) in conventional manner. Virtual Cells/local Cells may be identified by their Physical layer Cell Identities (PCI) just in the same way as macro cells are identified by their Physical layer Cell Identities (PCI). Here, when a virtual cell/local cell is activated, a PCI of the virtual cell/local cell can be assigned and the PCI may be updated to some of whitelists/Neighbour Cell Lists. On the other hand when the virtual cell/local cell is deactivated, this PCI can be released and it may be removed from whitelist/Neighbour Cell List. This modification of whitelist/Neighbour Cell List can be updated to only UEs in connected mode, since UEs in idle mode can perform macro cell based cell selection/reselection. Furthermore the UE may specify the virtual cell/local cell based on both the PCI of the macro cell which the virtual cell belongs to and the PCI of the virtual cell so that each macro cell can reuse the same PCI for virtual cell(s)/local cell(s) inside coverage of it. Each whitelist/Neighboring Cell List including virtual cell(s)/local cell(s) can be provided by each macro cell in hierarchy manner via some SIBs. "Reporting Configurations" 120 defines criteria that are used by a UE to trigger the transmission of a measurement report and the quantities that the UE includes in the report. "Measurement Identities" 130 defines respective identifiers that link one measurement object with one reporting configuration. A measurement identity is used as a reference number in the measurement report. "Quantity configurations" 140 defines the measurement quantities and associated filtering used for all event evaluation and related reporting per Radio Access Technology (RAT). "Measurement gaps" 150 defines periods of time that the UE may use to perform measurements while in connected mode.

FIG. 5 shows the "Measurement Objects" (110 in FIG. 4) in more detail. Measurement Objects 110 comprises a list of individual measurement objects. Each measurement object is identified by an object ID 111. Each object ID is associated with a specific measurement frequency 113 and a specific Physical layer Cell Identity (PCI) 115. In the example of FIG. 5 "Measurement Objects" comprises three measurement objects. A first measurement object is identified by object ID 1. It relates to a specific frequency "LTE carrier frequency 1" and to a specific cell with Physical layer Cell Identity 4. A second measurement object is identified by object ID 2. It relates to a specific frequency "LTE carrier frequency 2" and to a specific cell with Physical layer Cell Identity 5. A third measurement object is identified by object ID 3. It relates to a specific frequency "UMTS carrier frequency 1" and to a specific cell with Physical layer Cell Identity 10.

In order to distinguish one RRC state (FIG. 2) from the other RRC state (FIG. 3), the system may define two RRC states which would be for the macro cell and for the virtual cell, respectively. According to this embodiment, the condition in FIG. 2 is RRC connected mode for the macro cell 30 and RRC idle mode for the virtual cell 20. On the other hand, according to this embodiment, the condition in FIG. 3 is RRC connected mode for macro cell 30 and RRC connected mode for virtual cell 20. That is, a UE may have RRC connections with both, an eNB and a virtual cell, each RRC connection defining its own RRC state.

Figure 6:
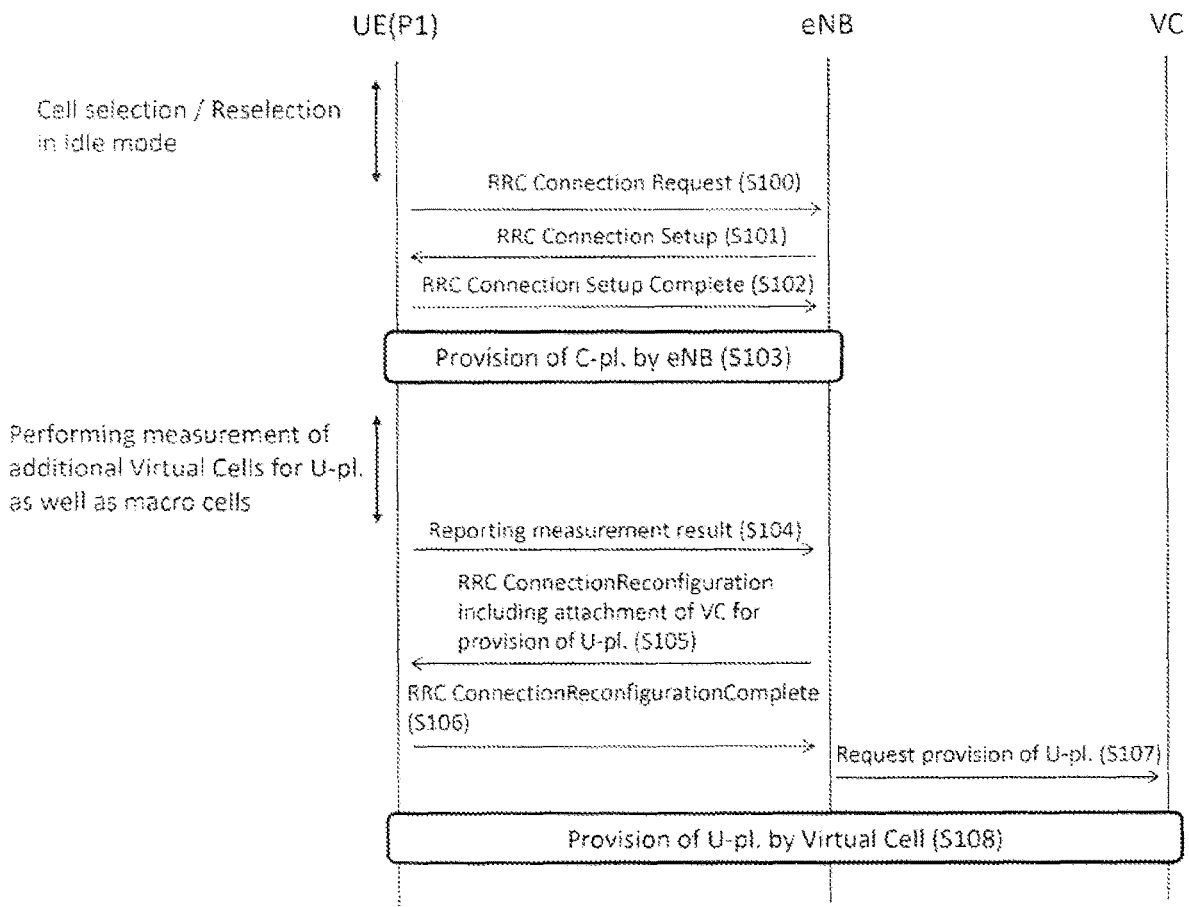
FIG. 6 schematically shows an example of a procedure to activate the provision of user plane by a virtual cell.

FIG. 6 schematically shows an example of a procedure to activate the provision of user plane by a virtual cell. A UE performs cell selection/reselection in idle mode. Prior to starting communication, at S100, the UE sends an RRC Connection Request message to an eNB. In response to this request, at S101, the eNB sends an RRC Connection Setup message to the UE. Furthermore, at S101 the UE is configured with UE measurement reporting by the eNB. According to the configured setup of measurement reporting, the UE performs a measurement of additional virtual cells/local cells for user plane as well as macro cells. After the UE completes any necessary setup based on the RRC Connection Setup message, at S102, the UE sends a RRC Connection Setup Complete message to the eNB. Then, at S103, the eNB starts provision of control plane to the UE. When any events of reporting the measurement are triggered, the UE, at S104, sends a measurement report to eNB. When the eNB decides based on the measurement report that a virtual cell/local cell can provide the UE with user plane, the eNB, at S105, sends a RRC ConnectionReconfiguration message to indicate an attachment of the virtual cell/local cell for provision of user plane to the UE. After the UE completes any necessary setup based on RRC ConnectionReconfiguration message, the UE sends, at S106, a RRC ConnectionReconfigurationComplete message to the eNB. When the eNB receives the RRC ConnectionReconfigurationComplete message, the eNB, at S107, requests a virtual cell/local cell to provide it with user plane. After the virtual cell/local cell receives the request of provision of user plane, the virtual cell, at S108, starts the provisioning of user plane to the UE.

Figure 7:
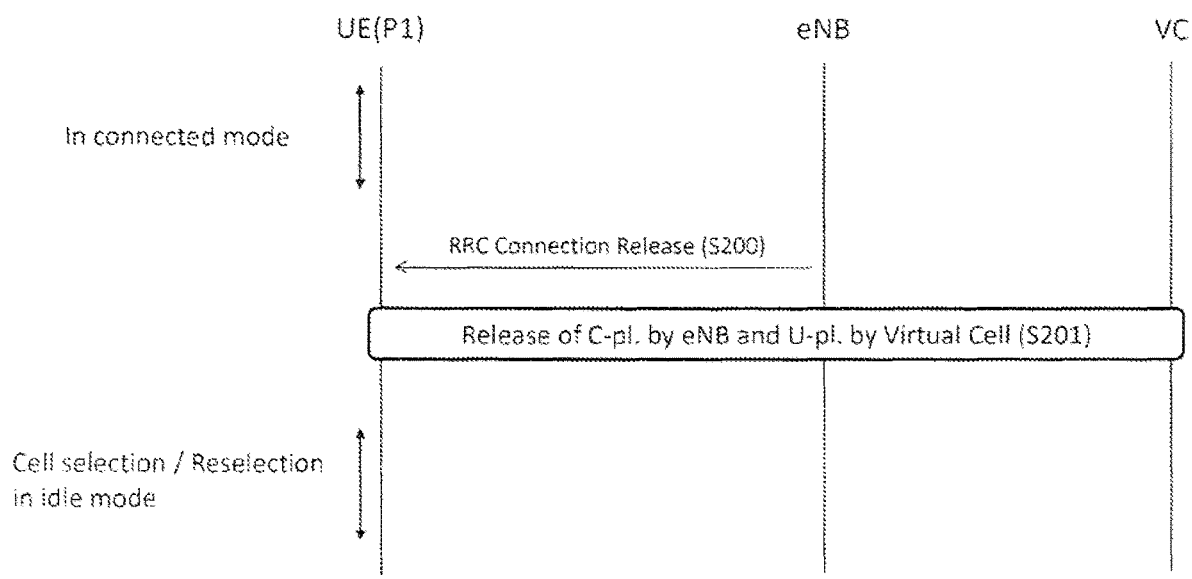
FIG. 7 schematically shows an example of a procedure to release the provision of control plane by an eNB and user plane by a virtual cell.

FIG. 7 schematically shows an example of a procedure to release the provision of control plane by an eNB and user plane by a virtual cell. In connected mode an eNB serves control plane to a UE and in this mode a virtual cell (VC)/local cell can serve user plane to the UE and the UE performs measurement of virtual cells/local cells as well as eNBs. After the UE finishes communication, the network may indicate to the UE to operate in idle mode for power saving. One possible procedure to make the UE operate in idle mode, is the use of an RRC Connection Release procedure. According to this embodiment, in the same way as it is presently done in LTE, the eNB may trigger a UE context release request to a Mobility Management Entity (MME) and the eNB, at S200, sends a RRC Connection Release message to UE after exchanging the necessary message among eNB, MME and S-GW (Serving GateWay). This procedure can be triggered by the eNB in cooperation with the virtual cell/local cell (i.e. the virtual cell/local cell may send some notification to eNB). In response to the RRC Connection Release message, at S201, the eNB releases the provision of the control plane and the virtual cell releases the provision of the user plane.

Furthermore in a future network such as 5G, new technology such as Software Defined Network (SDN) may be introduced. In this technology a function of a base station such as eNB and of a relay node, including virtual cell/local cell, may be similar to that of a router. In such a 5G network scenario, some newly introduced node may handle the role of triggering the RRC Connection Release procedure.

In accordance with the RRC Connection Release procedure, absolute priorities of cell reselection can be allocated to RF carriers belonging to both LTE and other Radio Access Technology (RAT) by using broadcasted system information. Here, the eNB may remove virtual cells/local cells for provision of user plane from "Measurement Objects" in accordance with the RRC Connection Release procedure so that the UE does not need to perform measurement of virtual cells/local cells as candidates (i.e. whitelist/Neighbour Cell List) for cell reselection. The removal of a virtual cell/local cells from "Measurement Objects" can also be done by a RRC Connection Reconfiguration procedure prior to the RRC Connection Release procedure.

In accordance with the procedures shown in FIG. 6 and FIG. 7, the UE can perform the measurement of virtual cells/local cells for provision of user plane only during connected mode.

Sharing of the Control Plane Between an eNB and a Virtual Cell/Local Cell in RRC Connected Mode In addition to the physical separation of control plane and user plane, a separation of the functions handled by the control plane can also be considered, taking into account suitable role assignment to eNB and virtual cell/local cell.

Since the mobility should be handled on a wider area basis, taking into account reduction of handover and so on, the control plane provided by a macro cell should handle any controls related to mobility management. Although a resource management on the control plane by the macro cell should be handled by the control plane provided by the macro cell, a resource management on the user plane provided by a virtual cell/local cell may be handled by the virtual cell itself, e.g. when the operation carrier frequency of the virtual cell/local cell is different from that of the eNB.

On the other hand, as envisaged with regard to a usage of mmWave and high dense small cells in 5G, an operation band of the user plane can be different from that of the control plane. Considering capacity improvement by usage of high dense small cells and the propagation characteristics of mmWave, different performance requirements between the control plane and the user plane are to be expected (i.e. the control plane is required to have a wider coverage than the user plane).

Figure 8:
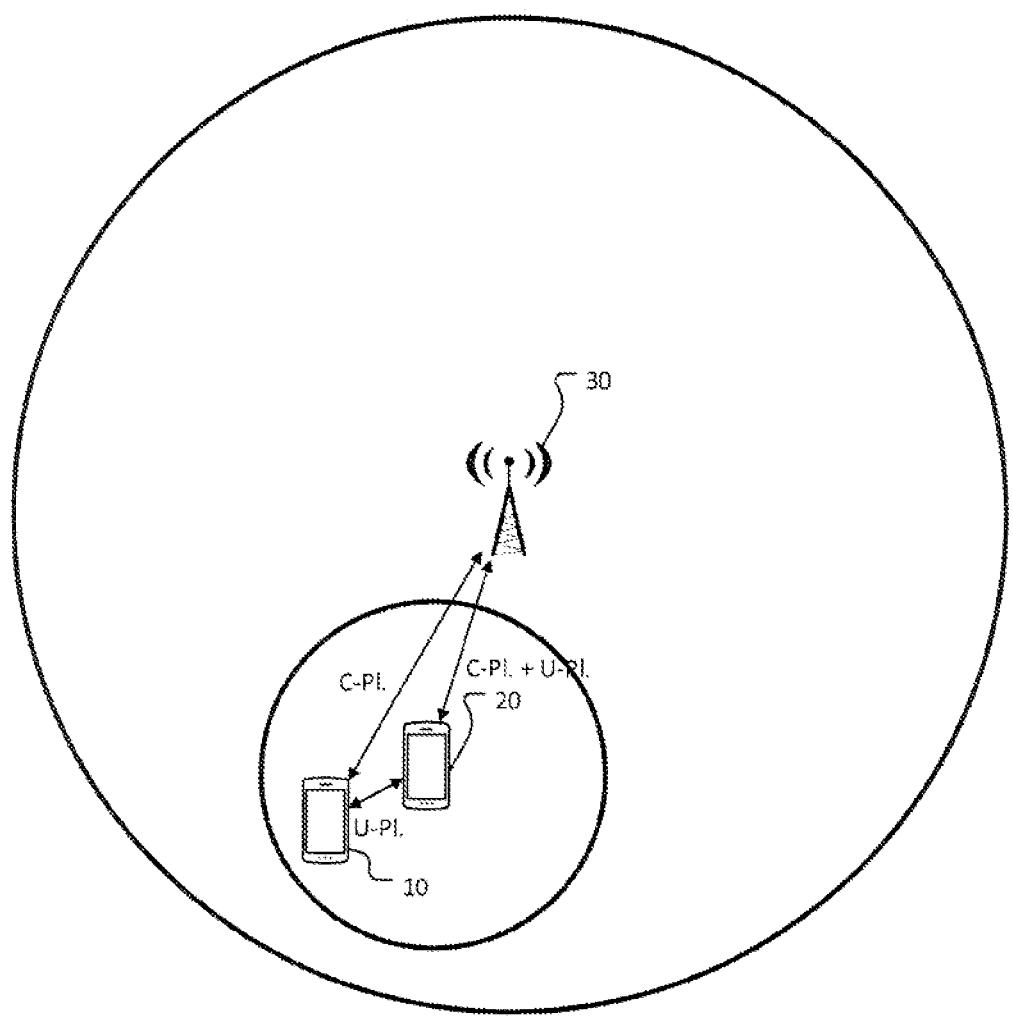
FIG. 8 shows an exemplary embodiment in which a UE is provided with two control planes.

FIG. 8 shows an exemplary embodiment in which a UE is provided with two control planes. According to the embodiment presented here, from a scheduling point of view, although the cross carrier scheduling could be applied to this operation, it is foreseen that the notification of scheduling assignment of each link between eNB and UE, or between the virtual cell/local cell and UE is performed by the eNB or, respectively, the virtual cell/local cell. That is to say, each link has a respective control plane. At least the control plane by eNB 30 handles controls related to mobility management and the notification of scheduling assignment on the control plane by eNB. Furthermore, as it is taken into account that a decision of handover and attach/detach of user plane would be performed by eNB, the control plane by eNB 30 also handles the measurement reporting for both eNB 30 and virtual cell/local cell 20, so that UE 10 can send both measurement report to the eNB 30.

In this embodiment, as it is taken into account that the cell sizes of the eNB and the virtual cell/local cell are different from each other, an event trigger for reporting measurement results is configured by eNB 30 and the virtual cell/local cell 20 independently. For example, event driven reports or periodic reports for eNB 30 can be configured by a RRC Connection Setup message in accordance with the RRC Connection Setup procedure, and event driven reports or periodic reports for virtual cell/local cell 20 can be configured by a RRC ConnectionReconfiguration message in accordance with the RRC ConnectionReconfiguration procedure, respectively.

Another possible solution for measurement reporting is to foresee that the measurement of each link between eNB 30 and UE 10 or between virtual cell/local cell 20 and UE 10 is handled by eNB 30 and virtual cell/local cell 20 independently, having a respective control plane over each link. According to this embodiment, even though independent configuration of measurement reporting is performed, since eNB 30 should handle both decision of handover of eNB itself and attach/detach of connection between virtual cell/local cell 20 and UE 10, the measurement report on the link between virtual cell/local cell 20 and UE 10 is sent to eNB 30 via the virtual cell/local cell 20 using the backhaul link.

Furthermore, in order to enhance 3GPP Rel-12 D2D (device to device) communication, a UE-NW relay operation is discussed in 3GPP Rel-13. Since the specified PC5 interface for D2D communication is based on broadcast communication, Hybrid Automatic Repeat reQuest (HARQ) is not supported for D2D communication. Taking into account that one of expected effect of virtual cell/local cell operation will be an improvement of the cell capacity by means of high dense deployment for hot spots, a virtual cell/local cell is expected to support unicast communication and HARQ. If this HARQ is managed via control plane by eNB, re-transmission data needs to be transferred over the backhaul link between the virtual cell/local cell and the donor eNB, even though this re-transmission is caused by a bad link quality between a wireless communication device and the virtual cell/local cell, and consumption of a lot of radio resources is expected to cause a problem of lack of radio resources. In view of this, it is here foreseen that the HARQ function is performed within the localized area served by a virtual cell/local cell, and that HARQ on the link between the virtual cell/local cell and the UE is managed by the control plane provided by the virtual cell/local cell.

Figure 9:
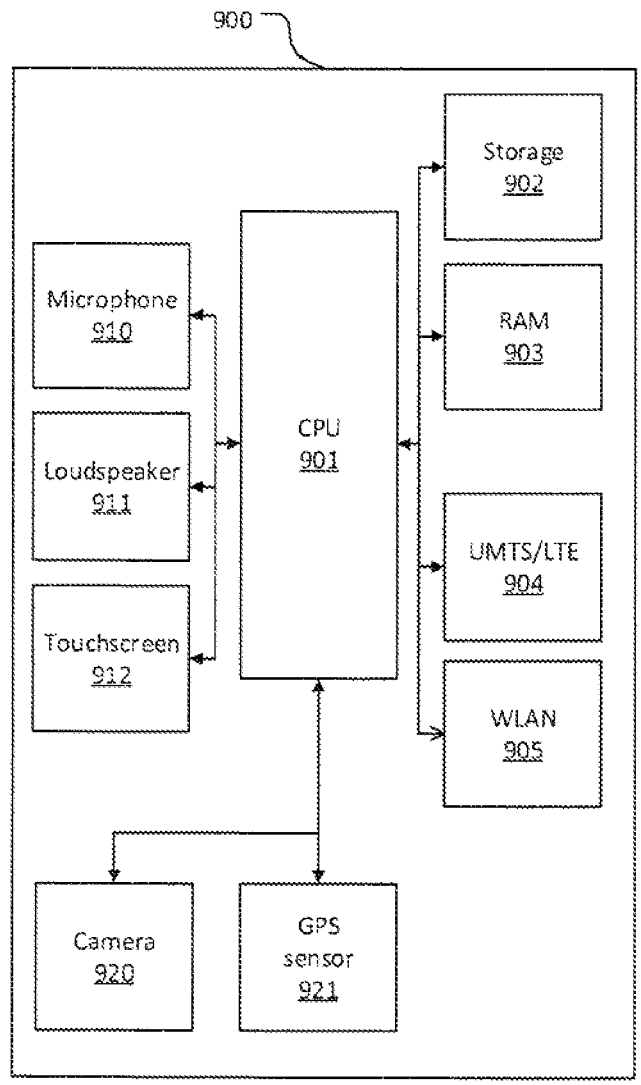
FIG. 9 schematically describes an embodiment of an electronic device that can be used to implement a wireless communication device that can act as UE in a telecommunication network.

FIG. 9 schematically describes an embodiment of an electronic device that can be used to implement a wireless communication device that can act as user equipment (UE) in a telecommunication network. The wireless communication device 900 comprises circuitry 901-921 such as a CPU 901 as processor. The wireless communication device 900 further comprises a microphone 910, a loudspeaker 911, and a touchscreen 912 that are connected to the processor 901. These units 910, 911, 912 act as a man-machine interface and enable a dialogue between a user and the wireless communication device 900. The wireless communication device 900 further comprises a WLAN interface 905 and an UMTS/LTE interface 904. These units 904, 905 act as I/O interfaces for data communication with external devices such as companion devices, servers, or cloud platforms. The wireless communication device 900 further comprises a camera sensor 920 and a GPS sensor 921. These units 920, 921 act as data sources and provide sensor data. The wireless communication device 900 further comprises circuitry such as data storage 902 and data memory 903 (here a RAM). The data memory 903 is arranged to temporarily store or cache data or computer instructions for processing by processor 901. The data storage 902 is arranged as a long term storage, e.g. for recording computer instructions or data received from a communication network, e.g. via the UMTS/LTE interface 904.

It should be noted that the description above is only an example configuration. Alternative configurations may be implemented with additional or other sensors, storage devices, interfaces or the like.

For example, interface 904 may support other radio access technologies than the mentioned technologies UMTS and LTE, and components such as camera sensor 920 and a GPS sensor 921, and the like may be omitted.

An electronic device with components as described in FIG. 9 can also be used to implement an indirect network connection node such as a virtual cell.

Still further also a macro base station can be implemented by an electronic device such as described with regard to FIG. 9. Just as the electronic device of FIG. 9 a macro base station comprises one or more processors and memories/storage for implementing control functionality by means of computer program instructions, and the like. A macro base station further comprises an air interface (providing e.g. E-UTRA protocols OFDMA (downlink) and SC-FDMA (uplink)) and network interfaces (implementing for example protocols such as S1-AP, GTP-U, S1-MME, X2-AP, or the like). The present disclosure is not limited to any particularities of such interfaces and respective protocols.

It should be recognized that the embodiments describe methods with an exemplary ordering of method steps. The specific ordering of method steps is however given for illustrative purposes only and should not be construed as binding.

It should be recognized that the division of the mobile communication device (900 in FIG. 9) into units 901 to 921 is only made for illustration purposes and that the present disclosure is not limited to any specific division of functions in specific units. For instance, the processor 901 could be implemented by a respective programmed processor, field programmable gate array (FPGA) and the like.

The embodiments describe methods for providing mobile communication. These methods can also be implemented as a computer program causing a computer and/or a processor (such as processor 901 of FIG. 9), to perform the method, when being carried out on the computer and/or processor.

According to the embodiments, the methods may also be implemented by a non-transitory computer-readable recording medium that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Further, it should be recognized that as far as the disclosure refers to circuitry that is configured to perform a specific function it is also envisaged that the circuitry may be configured to perform the methods described in the embodiments by means of computing instructions, software, computer programs, and/or the like.

Note that the present technology can also be configured as described below.

(1) A wireless communication device comprising circuitry that is configured to measure, in an idle mode, only macro cells, and to start the measurement of one or more indirect network connection nodes in accordance with the wireless communication device turning into a connected mode.

(2) The wireless communication device of (1) in which the circuitry is configured to receive/transmit a control plane from/to a macro cell and a user plane from/to one of the indirect network connection nodes.

(3) The wireless communication device of anyone of (1) to (2) in which the circuitry is configured to trigger a measurement of virtual cells/local cells in addition to that of macro cells in accordance with an RRC connection establishment.

(4) The wireless communication device of anyone of (1) to (3) in which the circuitry is further configured to receive a configuration message and to perform measurement reporting as defined by the configuration message.

(5) The wireless communication device of (4) in which the configuration message defines measurement objects, the measurement objects including intra-frequency measurement objects/inter-frequency measurement objects which specify individual cells to measure.

(6) The wireless communication device of (4) in which the configuration message defines individual cells that are to be excluded from measurements.

(7) The wireless communication device of (4) in which the configuration message defines one or more macro cells for a provision of a control plane and one or more indirect network connection nodes for a provision of a user plane.

(8) The wireless communication device of anyone of (1) to (7) in which the circuitry is further configured to manage connection states in cooperation with the network, wherein connection states for a control plane include an idle and/or a connected state, and the connection states for the user plane include at a least a connected state.

(9) The wireless communication device of anyone of (1) to (8) in which the circuitry is further configured to configure settings related to measurement reporting based on a classification of cell identification.

(10) The wireless communication device of anyone of (1) to (9) in which the circuitry is further configured to receive/transmit a control plane provided by an indirect network connection node and a user plane that is provided by the indirect network connection node.

(11) The wireless communication device of anyone of (1) to (10) in which the circuitry is further configured to receive/transmit a first control plane provided by an indirect network connection node and a second control plane that is provided by a macro cell.

(12) The wireless communication device of anyone of (1) to (11) in which the control plane is provided by an eNB and in which the control plane handles controls related to mobility management, the scheduling assignment, and/or the measurement reporting for both the eNB and the indirect network connection node.

(13) The wireless communication device of anyone of (1) to (12) comprising circuitry configured to manage event triggers for independently reporting measurement results to the eNB and/or to the indirect network connection node.

(14) The wireless communication device of anyone of (1) to (13) in which the circuitry is further configured to perform a HARQ function within the localized area served by the indirect network connection node.

(15) The wireless communication device of (14) in which the circuitry is further configured to manage a HARQ on the link between the indirect network connection node and the wireless communication device by a control plane provided by the indirect network connection node.

(16) A method comprising:
sending, by a macro cell, a configuration message to a wireless communication device, the configuration message comprising a configuration of measurement reporting, and
performing, by the wireless communication device, a measurement of one or more indirect network connection nodes for providing a user plane as well as macro cells, according to configured setup of measurement reporting.

(17) The method of (16), further comprising, selecting an indirect network connection node by the macro cell based on the measurement results reported by the wireless communication device.

(18) The method of (16) or (17), further comprising sending, by the macro cell, a second configuration message to the wireless communication device to indicate an attachment of an indirect network connection node for provision of a user plane to the wireless communication device.

(19) The method of anyone of (16) to (18), further comprising requesting, by the macro cell, an indirect network connection node to provide the wireless communication device with a user plane.

(20) The method of anyone of (16) to (19) further comprising sending, by the macro cell, a connection release message to the wireless communication device.

(21) A method comprising:
sending, by a UE, an RRC Connection Request message to an eNB;
sending, by the eNB, an RRC Connection Setup message to the UE, the RRC Connection Setup message comprising a configuration of UE measurement reporting;
sending, by the UE, a RRC Connection Setup Complete message to the eNB;

starting, by the eNB, the provision of control plane to the UE;
performing, by the UE, a measurement of virtual cells/local cells for user plane as well as macro cells, according to configured setup of measurement reporting;
sending, by the UE, a respective measurement report to eNB when an event of reporting a measurement is triggered;
requesting, by the eNB, a virtual cell/local cell to provide the UE with a user plane; and
starting, by the virtual cell/local cell, to provide the UE with a user plane.

(22) An indirect network connection node comprising circuitry configured to provide a user plane and/or a control plane to a wireless communication device as defined in (1) to (15).

(23) A system comprising
a wireless communication device as defined in (1) to (15);
at least one macro cell, the macro cell being configured to provide a control plane to the wireless communication device; and
at least one indirect network connection node, the indirect network connection node being configured to provide a user plane and/or a control plane to the wireless communication device.

(24) A wireless communication method comprising:
a wireless communication device establishing a first connection to exchange control signaling with a first base station,
wherein the first base station is selected among candidate base stations which are configured prior to the establishment of the first connection, and
a second base station which the first base station can control via the first connection, isn't included in the candidate base stations prior to the establishment of the first connection,
the first base station configuring the wireless communication device with a settings related to measurement of the first base station and one or a plurality of the second base station via dedicated control signaling over the first connection or broadcasted signaling, and indicating a second connection between the wireless communication device and the second base station selected based on measurement results performed by the wireless communication device,
wherein the wireless communication device exchanging data with a network by the second connection via the second base station.

(25) The wireless communication method of (24) further comprising:
the candidate base stations which are configured prior to the establishment of the first connection, are categorized into a first and a second candidate base stations,
wherein the wireless communication device selects the first base station among the first candidate base stations, and
the wireless communication device selects the second base station among the first and the second candidate base stations.

(26) The wireless communication method according to (24) or (25) further comprising the second base station being selected by the first base station or a node connected to the first base station based on the measurement results reported by the wireless communication device.

(27) The wireless communication method according to anyone of (24) or (26) further comprising: the second base station being selected by the wireless communication based on the measurement results.

(28) The wireless communication method according to anyone of (24) or (27) further comprising: the wireless communication device managing connection states in cooperation with the network, wherein the connection states for the first connection including idle or connected state and the connection states for the second connection including at least connected state.

(29) The wireless communication method according to anyone of (24) or (28) further comprising: the settings related to measurement reporting being configured based on a classification of cell identification.

(30) The wireless communication method according to anyone of (24) or (29) further comprising: the classification being classified based on at least one of size of cell coverage, maximum transmission power, number of equipped antenna, operating frequency band and bandwidth.

(31) The wireless communication method according to anyone of (24) or (30) further comprising: the second connection being divided into a connection for control signaling and a connection for data communication in logical or physical manner.

(32) The wireless communication method according to anyone of (24) or (31) further comprising:

the second base station configuring the settings of measurement reporting of the second base station in accordance with establishment of the second connection, and a measurement report on the link between the wireless communication device and the second base station being sent to the second base station using the second connection.

(33) The wireless communication method according to anyone of (24) or (32) further comprising: the connection for control signaling among connections being divided the second connection into, is used for sending the measurement report on the link between the wireless communication device and the second base station.

The invention claimed is:

1. A wireless communication device, comprising:
   circuitry configured to
   measure, in an idle mode, only macro cells, and start the measurement of one or more indirect network connection nodes in accordance with the wireless communication device turning into a connected mode,
   receive a configuration message and perform measurement reporting as defined by the configuration message, wherein the configuration message defines measurement objects, the measurement objects including intra-frequency measurement objects/inter-frequency measurement objects which specify individual cells to measure,
   perform receiving and transmitting a first control plane provided by an indirect network connection node and a second control plane that is provided by a macro cell, and
   manage a hybrid automatic repeat request (HARQ) on a link between the indirect network connection node and the wireless communication device by a control plane provided by the indirect network connection node.

2. The wireless communication device of claim 1, wherein the circuitry is configured to perform one or more of receiving a control plane from and transmitting a control plane to a macro cell and receiving a user plane from and transmitting a user plane to one of the indirect network connection nodes.

3. The wireless communication device of claim 1, wherein the circuitry is configured to trigger a measurement of virtual cells/local cells in addition to that of macro cells in accordance with an RRC connection establishment.

4. The wireless communication device of claim 1, wherein the configuration message defines individual cells that are to be excluded from measurements.

5. The wireless communication device of claim 1, wherein the configuration message defines one or more macro cells for a provision of a control plane and one or more indirect network connection nodes for a provision of a user plane.

6. The wireless communication device of claim 1, wherein the circuitry is further configured to manage connection states in cooperation with the network, wherein connection states for a control plane include one or more of an idle and a connected state, and the connection states for the user plane include at least a connected state.

7. The wireless communication device of claim 1, wherein the circuitry is further configured to configure settings related to measurement reporting based on a classification of cell identification.

8. The wireless communication device of claim 1, wherein the circuitry is further configured to perform one or more of receiving and transmitting a control plane provided by an indirect network connection node and a user plane that is provided by the indirect network connection node.

9. The wireless communication device of claim 1, wherein the control plane is provided by an eNB and the control plane handles one or more of controls related to mobility management, the scheduling assignment, and the measurement reporting for both the eNB and the indirect network connection node.

10. The wireless communication device of claim 1, wherein the circuitry is configured to manage event triggers for independently reporting measurement results to one or more of the eNB and to the indirect network connection node.

11. The wireless communication device of claim 1, wherein the circuitry is further configured to perform a HARQ function within the localized area served by the indirect network connection node.

12. A method comprising:
   sending, by a macro cell, a configuration message to a wireless communication device, the configuration message comprising a configuration of measurement reporting; and
   performing, by the wireless communication device, a measurement of one or more indirect network connection nodes for providing a user plane as well as macro cells, according to configured setup of measurement reporting;
   receiving, by the wireless communication device, a configuration message and performing measurement reporting as defined by the configuration message, wherein the configuration message defines measurement objects, the measurement objects including intra-frequency measurement objects/inter-frequency measurement objects which specify individual cells to measure;
   performing, by the wireless communication device, receiving and transmitting a first control plane provided by an indirect network connection node and a second control plane that is provided by a macro cell; and
   managing a hybrid automatic repeat request (HARQ) on a link between the indirect network connection node and the wireless communication device by a control plane provided by the indirect network connection node.

13. The method of claim 12, further comprising:
selecting an indirect network connection node by the macro cell based on the measurement results reported by the wireless communication device.

14. The method of claim 12, further comprising:
sending, by the macro cell, a second configuration message to the wireless communication device to indicate an attachment of an indirect network connection node for provision of a user plane to the wireless communication device.

15. The method of claim 12, further comprising:
requesting, by the macro cell, an indirect network connection node to provide the wireless communication device with a user plane.

16. The method of claim 12, further comprising:
sending, by the macro cell, a connection release message to the wireless communication device.

* * * * *